United States Patent [19]

Schäfer et al.

[11] Patent Number: 5,959,060
[45] Date of Patent: Sep. 28, 1999

[54] POLYISOCYANATE-MODIFIED POLYCARBOXYLIC ACIDS AND THEIR USE AS CROSSLINKING AGENTS FOR EPOXY RESINS

[75] Inventors: Walter Schäfer, Leichlingen; Knud Reuter, Krefeld; Hanns-Peter Müller, Odenthal; Hans-Ulrich Meier-Westhues, Leverkusen; Ulrich Freudenberg, Pulheim, all of Germany; Lothar Kahl, FRACC Atizapan de Zaragoza, Mexico

[73] Assignee: Bayer Aktiengesellschaft, Leverkusen, Germany

[21] Appl. No.: 09/061,422

[22] Filed: Apr. 16, 1998

[30] Foreign Application Priority Data

Apr. 22, 1997 [DE] Germany ............... 197 17 092

[51] Int. Cl.⁶ .................................. C08G 18/34
[52] U.S. Cl. ..................... 528/84; 528/407; 528/418; 525/408; 252/182.28
[58] Field of Search ............ 528/84, 407, 418; 525/408; 252/182.28

[56] References Cited

U.S. PATENT DOCUMENTS 5,371,167  12/1994  Rehfuss et al. .................. 528/73
5,492,955  2/1996   Wamprecht et al. ............. 525/375
5,534,601  7/1996   Reuter et al. .................... 525/424
5,574,112  11/1996  Kranig et al. .................... 525/327.3

FOREIGN PATENT DOCUMENTS 728782  8/1996  European Pat. Off. .

OTHER PUBLICATIONS

Patent Abstract s of Japan, vol. 004, No. 081 (C–014), Jun. 11, 1980 & JP 55 045759 A (Kansai Paint Co., Ltd.) Mar. 31, 1980.

Database WPI, AN 19677, XP002071028 "granule composite resin composition preparation" and JP 60 060 127 A (Hitachi Chemical) Apr. 6, 1985.

*Primary Examiner*—Rachel Gorr
*Attorney, Agent, or Firm*—Joseph C. Gil; Thomas W. Roy

[57] ABSTRACT

The present invention relates to polyisocyanate-modified dicarboxylic acid derivatives obtainable by reacting organic polyisocyanates with excess quantities, based on the equivalent ratio of NCO/COOH groups, of dicarboxylic acid (poly)anhydrides containing free carboxyl groups and water. The present invention also relates to coating compositions, in particular powder coating compositions, containing these polyisocyanate-modified dicarboxylic acids as curing agents for resins containing epoxy groups.

10 Claims, No Drawings

POLYISOCYANATE-MODIFIED POLYCARBOXYLIC ACIDS AND THEIR USE AS CROSSLINKING AGENTS FOR EPOXY RESINS

BACKGROUND OF THE INVENTION

1. Field of the Invention

The present invention relates to polyisocyanate-modified dicarboxylic acid derivatives, to a process for preparing these derivatives and to their use as curing agents for resins containing epoxy groups.

2. Description of the Prior Art

It is known to react dicarboxylic acids with polyepoxy compounds with opening of the epoxy ring to form high molecular weight polymers. The properties of coatings produced from these resins, such as impact strength and flexibility, are not entirely satisfactory for certain applications, for example, in automotive topcoat lacquers.

To reduce emissions and also fire and explosion hazards, particular emphasis has been placed on replacing systems containing solvents with powder coatings. In this case too, coating properties do not always satisfy the customer's requirements. The coatings often do not exhibit the desired resistance to chemicals and solvents. This is generally attributable to an excessively low crosslinking density.

An object of the present invention is to provide coating compositions, in particular powder coating compositions, having improved resistance to chemicals and solvents combined with good impact strength.

This object may be achieved with the curing agents for carboxyl/epoxy lacquers, in particular powder coatings, described hereinafter, which may be used to produce coatings having improved resistance to chemicals and solvents.

U.S. Pat. No. 5,371,167 describes compounds containing carboxylic acid groups as curing agents for carboxyl/epoxy powder coatings. These curing agents provide higher crosslinking densities and are produced from hydroxy- or aminocarboxylic acids and polyisocyanates, in which the hydroxyl or amino group is reacted with the isocyanate group. Particular care must be taken to ensure that during this synthesis the dual-functional hydroxy- or aminocarboxylic acid is used to the extent possible in strictly stoichiometric quantities. Any excess of hydroxycarboxylic acid or aminocarboxylic acid in the crosslinking agent reacts with (destroys) epoxy groups in the polyepoxy resin to be crosslinked without forming any crosslinks. An excess of polyisocyanate, in particular those having a functionality of >2, reacts with the polycarboxyl compounds to form crosslinked or high molecular weight polymers, which are disadvantageous for use as a curing agent for epoxy resins due to their inability to form a defect-free coating surface.

It is known that amides and ureas are formed when isocyanates react with carboxylic acids with the liberation of carbon dioxide. It is known that the reaction of polyisocyanates having a functionality of ≧2 with dicarboxylic acids having a carboxyl functionality of ≧2 to produce products containing carboxyl groups also gives rise, as the reaction ratio of the carboxyl and isocyanate groups approaches the equivalence point, to unwanted high molecular weight or crosslinked, infusible derivatives. In the presence of anhydride groups, additional crosslinking by imides, i.e., the reaction products of amides with anhydrides, is also expected.

EP-A 695,771 describes isocyanate-modified carboxylic anhydrides which are particularly suitable as powder coating curing agents. Additional crosslinking by reaction of the anhydride groups with the hydroxyl groups produced during the carboxyl/epoxy reaction is also possible with these polycarboxylic acids containing anhydride groups. One disadvantage is that addition of isocyanate to the curing agent, for example to increase toughness, increases the molecular weight to such an extent that flow problems may occur in the coating during application.

EP-A 695,771 also describes the addition of organic hydroxy-functional compounds to modify the curing agent and to control molecular weight. However, this consumes carboxyl or anhydride groups, which reduces the crosslinking potential of the curing agent. When organic hydroxyl compounds having a functionality of >1 are used, relatively high molecular weight fractions may be formed or there may be a risk of crosslinking.

It has now surprisingly been found that, when polyisocyanates having a functionality of ≧2 are reacted with dicarboxylic acids containing anhydride groups, polycarboxylic acids which yield a low viscosity melt may be obtained by the addition of water. When these acids are combined with conventional binders containing epoxy groups, they allow for the production of high quality coating compositions. It was particularly surprising that crosslinking could be prevented in the hydrophobic reaction mixture by the addition of water.

SUMMARY OF THE INVENTION

The present invention relates to polyisocyanate-modified dicarboxylic acid derivatives obtainable by reacting organic polyisocyanates with excess quantities, based on the equivalent ratio of NCO/COOH groups, of dicarboxylic acid (poly)anhydrides containing free carboxyl groups and water.

The present invention also relates to coating compositions, in particular powder coating compositions, containing these polyisocyanate-modified dicarboxylic acids as curing agents for resins containing epoxy groups.

DETAILED DESCRIPTION OF THE INVENTION

Preferred polyisocyanate-modified dicarboxylic acid derivatives are those having a carboxyl group content of 2 to 40 wt. %, an anhydride group content (calculated as $C_2O_3$) of 0 to 20 wt. % and a nitrogen content of 0.1 to 10 wt. %. These derivatives are prepared by reacting,
with elimination of carbon dioxide, at an NCO/COOH equivalent ratio of 0.1:1 to 0.9:1

A) an anhydride component containing at least one dicarboxylic acid (poly)anhydride corresponding to formula (I)

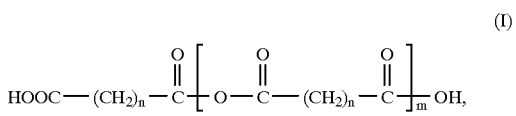

and up to 50 wt. %, based on the total weight of component A), of dicarboxylic acids corresponding to formula (II)

with

B) a polyisocyanate component containing at least one polyisocyanate and

C) water in a molar ratio of water to anhydride groups of 0.1:1 to 10:1 wherein m represents an integer from 1 to 100 and n represents an integer from 4 to 16.

Examples of suitable dicarboxylic acids corresponding to formula (II) include adipic acid, azelaic acid, sebacic acid and 1,12-dodecanedioic acid. Adipic acid and 1,12-dodecanedioic acid are preferred.

The anhydrides of the formula (I) correspond to the preceding acids and may be produced known manner by reacting the corresponding dicarboxylic acid with acetic anhydride at 120 to 150° C. with subsequent removal of volatile constituents from the reaction mixture by distillation at temperatures of up to 200° C. In this reaction, the starting materials are used in amounts corresponding to a molar ratio of acetic anhydride to dicarboxylic acid of at least 0.25:1, preferably of at least 0.5:1 and more preferably 0.5:1 to 0.9:1.

Any organic compounds containing at least two isocyanate groups per molecule and which are otherwise inert under the reaction conditions of the process according to the invention are suitable as polyisocyanate component B). Suitable compounds include aromatic polyisocyanates, reaction products of 2,4- and/or 2,6-diisocyanatotoluene with low molecular weight polyols (such as tri-methylolpropane), diisocyanates containing uretidione groups and prepared from 2,4- and/or 2,6-diisocyanatotoluene, polyisocyanates containing isocyanurate groups and prepared from these diisocyanates and mixtures of the preceding aromatic polyisocyanates.

Preferably, however, the polyisocyanate component B) is selected from organic polyisocyanates having (cyclo) aliphatically bound isocyanate groups and a molecular weight of 168 to 1000, such as hexamethylene diisocyanate (HDI), isophorone diisocyanate (IPDI), 4,4'-diisocyanato-dicyclohexylmethane or known derivatives of these diisocyanates containing biuret groups, isocyanurate groups, uretidione groups, urethane groups and/or allophanate groups. Mixed trimers prepared from aliphatic and aromatic diisocyanates, in particular from HDI and 2,4- and/or 2,6-diisocyanatotoluene may also be used a component B) according to the invention. Also suitable as component B) are mixtures of the preceding polyisocyanates.

Component B) is used in the production of the polyisocyanate-modified dicarboxylic acid derivatives in amounts of 1 to 60, preferably 15 to 40 wt. %, based on the total weight of components A) and B), provided that the NCO/COOH equivalent ratio is at most 0.9:1, preferably 0.2:1 to 0.8:1.

Component C), the water, is used in quantities such that the molar ratio of water to anhydride groups is 0.1:1 to 10:1, preferably 0.2:1 to 1:1.

The reaction between components A) and B) generally proceeds in a melt at 80 to 180° C., preferably at 95 to 150° C.

In a preferred process, polycarboxyl (poly)anhydride A), which is present initially, is combined alternately with isocyanate B) and water C), such that the added quantity of isocyanate or water has reacted with the polycarboxyl (poly) anhydride before any more of the other component is added. Completion of the reaction can be determined by the cessation of $CO_2$ evolution or the formation of water of condensation. The added molar quantity of water should not exceed the molar content of anhydride groups before addition of the total quantity of isocyanate.

The content of free acid plus anhydride-bound acid in the curing agent, i.e., the total acid content, is determined by titration in known manner in pyridine with 1 N NaOH against Nile Blue chloride as the indicator.

The acid anhydride content is determined from the difference between the total acid content of a sample before the reaction and the acid content of a sample after the reaction with an excess quantity, based on the anhydride groups, of n-propanol at 110° C.

The free acid content in the curing agent is calculated from the difference between the total acid content and the acid anhydride content.

It is possible in accordance with the present invention to also use organic modification components such as mono- and dihydroxy compounds or monoiso- cyanates, which may be used in quantities of 0 to 10 wt. %, based on the total weight of components A) and B). When used, they are generally blended with component A). Suitable monohydroxy compounds include methanol, ethanol, butanol, cyclohexanol and octadecanol. Suitable dihydroxy compounds include ethylene glycol, propylene glycol, polyethylene glycol, polypropylene glycol, butylene glycol and adipol. Suitable monoisocyanates include butyl isocyanate, stearyl isocyanate and cyclohexyl isocyanate.

Particularly preferred compounds according to the invention are reaction products of 50 to 80 parts of component A) with 20 to 45 parts of component B) and 0,5 to 5 parts of component C).

The compounds according to the invention are suitable as curing agents for epoxy resin-containing binders. These compounds are preferably solid below 60° C. and liquid above 150° C. and, thus, are suitable as powder coating curing agents for epoxy resin-containing binders.

The coating compositions according to the invention may also contain other known coating additives, such as flow control agents, catalysts, pigments, flatting agents and UV stabilizers.

The coating compositions preferably contain 10 to 50 wt. % of curing agents according to the invention and 50 to 90 wt. % of epoxy resins, wherein the sum of these percentages is 100, based on the weight of the binder components.

Preferred binders containing epoxy groups are epoxy-functional acrylic polymers, but polyglycidyl ethers of OH-functional polycondensation products may also be used. The epoxy-functional acrylic polymers include copolymers of ethylenically unsaturated esters or ethers having epoxy groups (such as glycidyl acrylate, glycidyl methacrylate and allylglycidyl ethers) with other comonomers including esters of acrylic and methacrylic acid with monohydric $C_{1-18}$ alcohols. Examples of these esters include methyl(meth) acrylate, ethyl(meth)acrylate, butyl(meth)acrylate, isobutyl (meth)acrylate, hexyl(meth)acrylate, 2-ethylhexyl(meth) acrylate and stearyl(meth)acrylate.

Other comonomers without epoxy groups include styrene, α-methylstyrene, vinyltoluene, (meth)acrylonitrile, vinyl (idene)halides (such as vinyl chloride and vinylidene chloride) and vinyl esters (such as vinyl acetate and vinyl versatate.

The amount of epoxy-functional monomers used for the synthesis of the acrylic polymer is preferably 5 to 60 wt. %, more preferably 20 to 50 wt. %, based on the weight of the total monomer mixture. The epoxy equivalent weight of the copolymers containing epoxy groups is preferably 250 to 1000.

The curing agents according to the invention may also be used in combination with epoxy-functional polycondensation resins. Examples of these resins are the known reaction products of epichlorohydrin with polyhydric phenols, in particular bisphenol A, or with phenol-based novolaks.

Suitable solvents for the curing agent/binder composition for liquid coating applications are organic liquids which do not contain acidic or amino functionality. Examples include acetates, such as butyl acetate, hexyl acetate and octyl acetate; glycol ethers and glycol ether acetates, such as propylene glycol ether and propylene glycol monomethyl ether acetate; ketones, such as methyl propyl ketone, methyl butyl ketone and methyl hexyl ketone; and N-methylpyrrolidone.

The solutions of the lacquer binder and the curing agent according to the invention are preferably stored separately in order to prevent any premature reaction. The solutions of the components are then only mixed shortly before application.

Spraying is the preferred method for applying the reaction components onto a substrate. Suitable substrates include metal, ceramics, glass, plastics and wood.

Powder coatings may be produced from the stated components, for example, by homogenizing them in an extruder and by melting them and grinding the solidified melt. The powder coatings are applied in known manner, for example, by electrostatic spraying.

The powder coatings according to the invention generally have a softening range of 80 to 120° C.

The coatings according to the invention may be cured at stoving temperatures of about 120 to 180° C., preferably 130 to 160° C. Stoving times are dependent upon the stoving temperature, but are generally about 10 to 40 minutes, preferably 15 to 30 minutes.

EXAMPLES

All parts and percentages are by weight, unless otherwise indicated.

Example 1 a) 1900 parts of dodecanedioic acid and 490 parts of acetic anhydride were refluxed at 130° C. The acetic acid produced was removed by stripping at 130° C. and 0.3 mbar.

b) 450 parts of an HDI trimer having an NCO content of 21%, were added within 45 minutes at 130° C. to dodecanedioic acid a) and the reaction mixture was stirred until the evolution of $CO_2$ ceased.

50 parts of water were then stirred in and, after 2 hours, an additional 350 parts of HDI trimer were added dropwise. After the evolution of $CO_2$ ceased, nitrogen was passed through the product for 2 hours and a high vacuum was then applied for 30 minutes.

The product, which melted at 88 to 97° C., had a carboxyl group content of 17.2%, an anhydride group content of 3.2% and a nitrogen content of 2.2%.

Example 2

700 parts of HDI trimer having an NCO content of 21% were added over a period of 45 minutes at 130 to 140° C. to dodecanedioic anhydride a) from Example 1 and stirring was continued until the evolution of $CO_2$ ceased. The product was very viscous and rubber-like at 140° C. 40 parts of water were added dropwise and, after 2 hours, an additional 300 parts of HDI trimer were added. After the evolution of $CO_2$ had ceased, an additional 20 parts of water were added and the reaction product was stirred for an additional 2 hours at 140° C. The product was liquid at 140° C. Nitrogen was passed through the product for 2 hours and a high vacuum was then applied for 30 minutes.

The product, which melted at 92 to 98° C., had a carboxyl group content of 17.1%, an anhydride group content of 0.8% and a nitrogen content of 2.6%.

Example 3

450 parts of an IPDI trimer having an NCO content of 17.2% were incrementally added over a period of 45 minutes at 130° C. to dodecanedioic anhydride a) from Example 1 and stirring was continued until the evolution of $CO_2$ ceased. 40 parts of water were added and, after 2 hours, an additional 350 parts of IPDI trimer were added. After the evolution of $CO_2$ had ceased, an additional 10 parts of water were added and the reaction product was stirred for an additional 2 hours at 140° C. Nitrogen was passed through the product for 2 hours and a high vacuum was then applied for 30 minutes.

The product, which melted at 106 to 120° C., had a carboxyl group content of 19.0%, an anhydride group content of 3.4% and a nitrogen content of 1.8%.

Example 4

500 parts of 4,4'-diisocyanatodicyclohexylmethane were added over a period of 45 minutes at 130° C. to dodecanedioic anhydride a) from Example 1 and the reaction mixture was stirred until the evolution of $CO_2$ ceased. 10 parts of water were added and, after 2 hours, an additional 100 parts of dicyclohexylmethane 4,4'-diisocyanate were added. After the evolution of $CO_2$ had ceased, nitrogen was passed through the product for 2 hours and a high vacuum was then applied for 30 minutes.

The product, which melted at 88 to 97° C., had a carboxyl group content of 19.3%, an anhydride group content of 3.2% and a nitrogen content of 2.8%.

Example 5

500 parts of isophorone diisocyanate were added over a period of 45 minutes at 130° C. to dodecanedioic anhydride a) from Example 1 and the reaction mixture was stirred until the evolution of $CO_2$ ceased. 25 parts of water were added and, after 2 hours, an additional 100 parts of isophorone diisocyanate were added. After the evolution of $CO_2$ had ceased, nitrogen was passed through the product for 2 hours and a high vacuum was then applied for 30 minutes.

The product, which melted at 88 to 97° C., had a carboxyl group content of 12.3%, an anhydride group content of 8.4% and a nitrogen content of 3.4%.

Example 6

600 g of dicyclohexylmethane 4,4'-diisocyanate were added over a period of 45 minutes at 130° C. to dodecanedioic anhydride a) from Example 1 and the reaction mixture was stirred until the evolution of $CO_2$ ceased. In order to reduce viscosity, 2 parts of water were added to the reaction mixture through a feed line and stirring was continued for 1 hour at 140° C. Nitrogen was passed through the product for 2 hours and a high vacuum was then applied for 30 minutes.

The product, which melted at 65 to 81° C., had a carboxyl group content of 8.6%, an anhydride group content of 12.7% and a nitrogen content of 2.9%.

Example 7

1200 parts of adipic acid and 490 parts of acetic anhydride were refluxed at up to 125° C. The acetic acid produced was then removed by stripping at 125° C. and 0.3 mbar.

300 parts of an HDI trimer having an NCO content of 21% were added over a period of 45 minutes at 120° C. to the previously described adipic anhydride and reaction mixture was stirred until the evolution of $CO_2$ ceased. 25 parts of water were then stirred in. After 2 hours, an additional 300 parts of HDI trimer were added dropwise. After the evolution of $CO_2$ had ceased, 75 parts of water were added and the reaction product was stirred for an additional 2 hours at 120° C. Nitrogen was passed through the product for 2 hours and a high vacuum was then applied for 30 minutes.

The product, which melted at 80 to 130° C., had a carboxyl group content of 32%, an anhydride group content of <1% and a nitrogen content of 6%.

Application Example

To prepare coatings, 69 parts of a polyepoxy resin (Almatex PD 7610, a polyacrylate copolymer from Mitsui Toatsu, epoxy equivalent weight=526), 29 parts of the curing agent from Example 1, 1 part of tin(II) octoate and 1 part of a flow control agent (Perenol F30P from Henkel) were thoroughly mixed and then homogenized in a model PLK 46 kneader from Buss AG, Basel. The barrel temperature was 40° C. in the feed zone and 50° C. in the processing section. The kneader shaft ran at 150 rpm. Extrusion was performed twice in order to ensure optimum mixing. The solidified melts were ground in a model ACM 2 classifying mill from Hosokawa-Mikropul, Cologne, to yield powder coatings having a particle size of <90 μm. The powders were applied onto degreased steel sheets using an electrostatic cup gun from ESB. A high voltage of 70 kV(-) was applied during spraying. The coating was cured for 30 minutes at 150° C. The resulting coating had the following properties:

| | |
|---|---|
| Gloss value, 20° C./60° C. | 86/106(%) |
| Erichsen indentation (DIN 53156) | >9 (mm) |
| Xylene rubbing test (50 double rubs) | no change |
| Acetone rubbing test (50 double rubs) | no change |
| 40 vol. % sulphuric acid, 20 min at 60° C. | no change |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate-modified dicarboxylic acid derivative which is obtained by reacting organic polyisocyanates with an excess quantity, based on the equivalent ratio of NCO/COOH groups, of a dicarboxylic acid (poly)anhydride containing free carboxyl groups and water.

2. The polyisocyanate-modified dicarboxylic acid derivative of claim 1 wherein said derivative has a carboxyl group content of 2 to 40 wt. %, an anhydride group content (calculated as $C_2O_3$) of 0 to 20 wt. % and a nitrogen content of 0.1 to 10 wt. %, and wherein said derivative is prepared at an NCO/COOH equivalent ratio of 0.1:1 to 0.9:1.

3. The polyisocyanate-modified dicarboxylic acid derivative of claim 1 wherein the molar ratio of water to anhydride groups is 0.1:1 to 10:1.

4. The polyisocyanate-modified dicarboxylic acid derivative of claim 2 wherein the molar ratio of water to anhydride groups is 0.1:1 to 10:1.

5. The polyisocyanate-modified dicarboxylic acid derivative of claim 1 wherein the molar ratio of water to anhydride groups is 0.2:1 to 1:1.

6. The polyisocyanate-modified dicarboxylic acid derivative of claim 2 wherein the molar ratio of water to anhydride groups is 0.2:1 to 1:1.

7. A polyisocyanate-modified dicarboxylic acid derivative which has a carboxyl group content of 2 to 40 wt. %, an anhydride group content (calculated as $C_2O_3$) of 0 to 20 wt. % and a nitrogen content of 0.1 to 10 wt. %, and is prepared by reacting, with elimination of carbon dioxide, at an NCO/COOH equivalent ratio of 0.1:1 to 0.9:1

A) an anhydride component containing at least one dicarboxylic acid (poly)anhydride corresponding to formula (1)

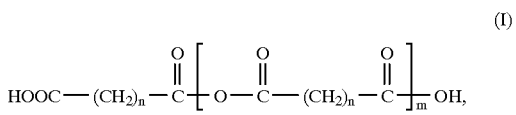

and up to 50 wt. %, based on the total weight of component A), of a dicarboxylic acid corresponding to formula (II)

with

B) a polyisocyanate component containing at least one polyisocyanate and

C) water in a molar ratio of water to anhydride groups of 0.1:1 to 10:1 wherein m represents an integer from 1 to 100 and n represents an integer from 4 to 16.

8. The polyisocyanate-modified dicarboxylic acid derivative of claim 1 wherein the molar ratio of water to anhydride groups is 0.2:1 to 1:1.

9. A coating composition containing the polyisocyanate-modified dicarboxylic acid derivative of claim 1 and a resin containing epoxy groups.

10. A powder coating composition containing the polyisocyanate-modified dicarboxylic acid derivative of claim 1, which is solid below 60° C. and liquid above 150° C., and a resin containing epoxy groups.

* * * * *